(12) United States Patent
Takeuchi et al.

(10) Patent No.: US 9,132,761 B2
(45) Date of Patent: Sep. 15, 2015

(54) VEHICLE SEAT

(75) Inventors: Eishi Takeuchi, Nagoya (JP); Kohshi Katoh, Hadano (JP); Shunsuke Tanaka, Nisshin (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 13/514,493

(22) PCT Filed: Aug. 10, 2011

(86) PCT No.: PCT/JP2011/068319
§ 371 (c)(1),
(2), (4) Date: Jun. 7, 2012

(87) PCT Pub. No.: WO2013/021495
PCT Pub. Date: Feb. 14, 2013

(65) Prior Publication Data
US 2014/0159463 A1  Jun. 12, 2014

(51) Int. Cl.
*B60N 2/72* (2006.01)
*B60N 2/70* (2006.01)

(52) U.S. Cl.
CPC ............. *B60N 2/7094* (2013.01); *B60N 2/72* (2013.01)

(58) Field of Classification Search
CPC .......... A47C 7/30; B60N 2/7058; B60N 2/72; B60N 2/7094
USPC ........ 267/142, 144, 165; 297/452.49, 452.52, 297/452.54
See application file for complete search history.

(56) References Cited

U.S. PATENT DOCUMENTS

| | | | |
|---|---|---|---|
| 2,642,932 A * | 6/1953 | Neely et al. ................... | 403/208 |
| 2,657,740 A | 11/1953 | Daniels et al. | |
| 2,851,088 A | 9/1958 | Pietruszka | |
| 2,851,089 A * | 9/1958 | Pietruszka ................... | 267/144 |
| 3,151,853 A * | 10/1964 | Richardson et al. .......... | 267/144 |
| 3,356,359 A * | 12/1967 | Bond ............................ | 267/102 |
| 4,682,763 A | 7/1987 | Kazaoka et al. | |
| 2013/0278041 A1* | 10/2013 | Matsumoto et al. ..... | 297/452.49 |

FOREIGN PATENT DOCUMENTS

| | | |
|---|---|---|
| JP | 60-207613 A | 10/1985 |
| JP | 2007-021063 A | 2/2007 |

\* cited by examiner

*Primary Examiner* — Anna Momper
(74) *Attorney, Agent, or Firm* — Sughrue Mion, PLLC

(57) ABSTRACT

Disclosed is a vehicle seat that is capable of changing a property of S springs with a simple configuration and therefore improves a seating property by changing the property of the S spring in response to a physique of a passenger.
In regard to a vehicle seat 1 in which S springs 6 are stretched in a seat cushion frame that supports a seat cushion on which the passenger sits, a restriction member 13 that is detachably attached to each of the S springs 6 and partially restricts an extensional deformation of the S springs 6 is provided. The restriction member 13 includes a pair of wire hook portions 15 and 16 that is hooked on a horizontal portion 8 and a back-end horizontal portion 12 of the S spring 6, and a long wire portion 14 that connects the pair of wire hook portions 15 and 16. When the pair of wire hook portions 15 and 16 of the restriction member 13 is hooked, extensional rigidity of the S spring 6 may be raised and therefore bending rigidity of the S spring 6 may be changed by changing the hooking position of the pair of wire hook portions 15 and 16 of the restriction member 13.

3 Claims, 13 Drawing Sheets

VEHICLE SEAT

CROSS REFERENCE TO RELATED APPLICATIONS

This application is a National Stage of International Application No. PCT/JP2011/068319 filed Aug. 10, 2010, the contents of all of which are incorporated herein by reference in their entirety.

TECHNICAL FIELD

The present invention relates to a vehicle seat in which S springs are stretched in a seating portion.

BACKGROUND ART

Patent Literature 1 discloses a vehicle seat in which S springs are stretched in a leaf spring that is installed in a seat frame. This vehicle seat changes a cushion property of a seat cushion in conformity to body weight of a passenger who sits on the vehicle seat, and allows the leaf spring to rotate with respect to a seat cushion frame, and changes section modulus of the leaf spring in response to a rotational position.

CITATION LIST

Patent Literature

[Patent Literature 1] Japanese Unexamined Patent Application Publication No. 2007-021063

SUMMARY OF INVENTION

Technical Problem

However, the vehicle seat disclosed in Patent Literature 1 has a problem in that a structure thereof becomes complicated. Therefore, there is still room for improvement in a seating property of the vehicle seat.

Therefore, an object of the invention is to provide a vehicle seat that is capable of changing a spring property of S springs with a simple configuration.

Solution to Problem

According to an embodiment of the invention, there is provided a vehicle seat in which S springs are stretched in a seating portion. The vehicle seat includes restriction member, which is detachably attached to the S springs, for partially restricting an extensional deformation of the S springs, wherein each of the S springs includes a vertical portion that extends in a stretching direction of the S spring, and a horizontal portion that extends in a direction orthogonal to the stretching direction of the S spring, wherein the restriction member includes a long member, and two or more locking portions that are attached to the long member and are locked on the horizontal portion, and wherein when the locking portion is locked on the horizontal portion, the extensional deformation of a back-end portion of the S spring in a front-back direction of the vehicle is partially restricted by the restriction member.

The property of the S springs is expressed by bending rigidity and extensional rigidity, but according to the vehicle seat related to the invention, the extensional rigidity of the S spring may be raised by partially restricting the extensional deformation of the S spring using the restriction member. In addition, since the extensional rigidity of the S spring is changed by attaching or detaching this restriction member to change an elastic deformation restriction length in the S spring, the property of the S spring may be changed. In this manner, according to the device for a vehicle related to the invention, the property of the S spring may be changed by the restriction member with a simple configuration that partially restricts the extensional deformation of the S spring. Furthermore, when the property of the S spring is changed in response to a physique or preference of a passenger, a seating property may be improved.

In addition, in this configuration, the locking of the restriction member with respect to the S spring may be easily performed. Furthermore, when a position of the S spring on which the locking portions are locked, a length of the long member, the locking portions that are locked on the S spring, or the like is changed, the extensional deformation restriction length in the S spring may be easily changed.

In addition, in this manner, when the extensional deformation of the back-end portion of the S spring in the front-back direction of the vehicle is restricted, the rigidity of the back-end portion of the S spring may be raised. Due to this, the falling down of the waist of the passenger who sits on the seat toward a back side is suppressed and therefore the posture-collapsing of the passenger is suppressed.

In addition, the long member may have non-elasticity.

In addition, the long member may have an extensional rigidity higher than that of the S spring.

Advantageous Effects of Invention

According to this invention, since the property of the S spring may be changed with a simple configuration, the seating property may be improved by changing the property of the S spring in response to a physique of the passenger.

DESCRIPTION OF EMBODIMENTS

Figure 1:
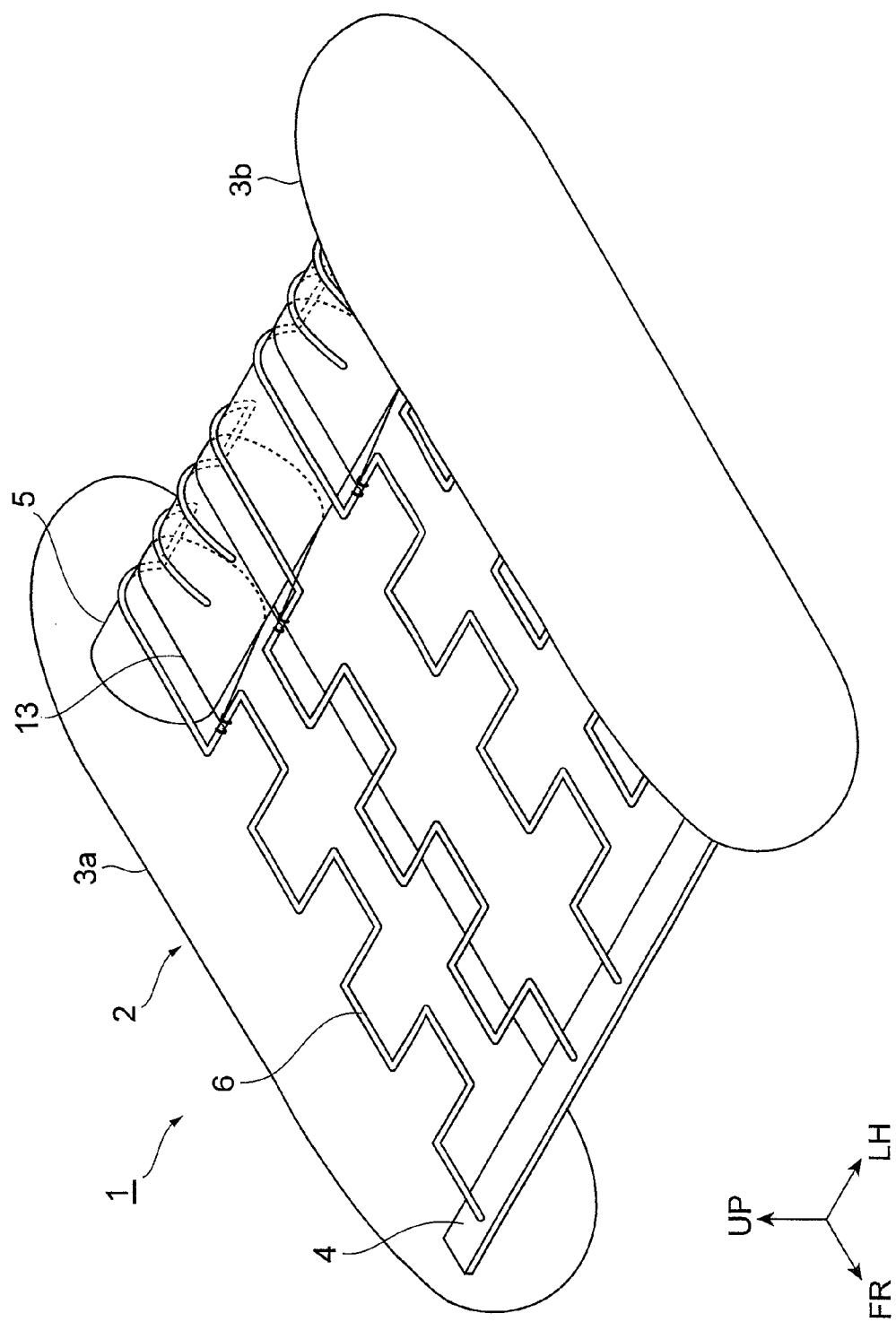
FIG. 1 is a partial perspective view illustrating an inner structure of a vehicle seat according to an embodiment.

Hereinafter, an embodiment of a vehicle seat according to the invention will be described with reference the attached drawings. In addition, in respective drawings, like reference numerals will be given to like parts having substantially same functions, and redundant description thereof will be omitted.

The vehicle seat according to this embodiment is a seat which is mounted in a vehicle and on which a passenger inside the vehicle sits.

Therefore, a front-back direction, a vertical direction, and a crosswise direction of the vehicle seat are the same as a front-back direction, a vertical direction, and a crosswise direction of the vehicle.

Figure 2:
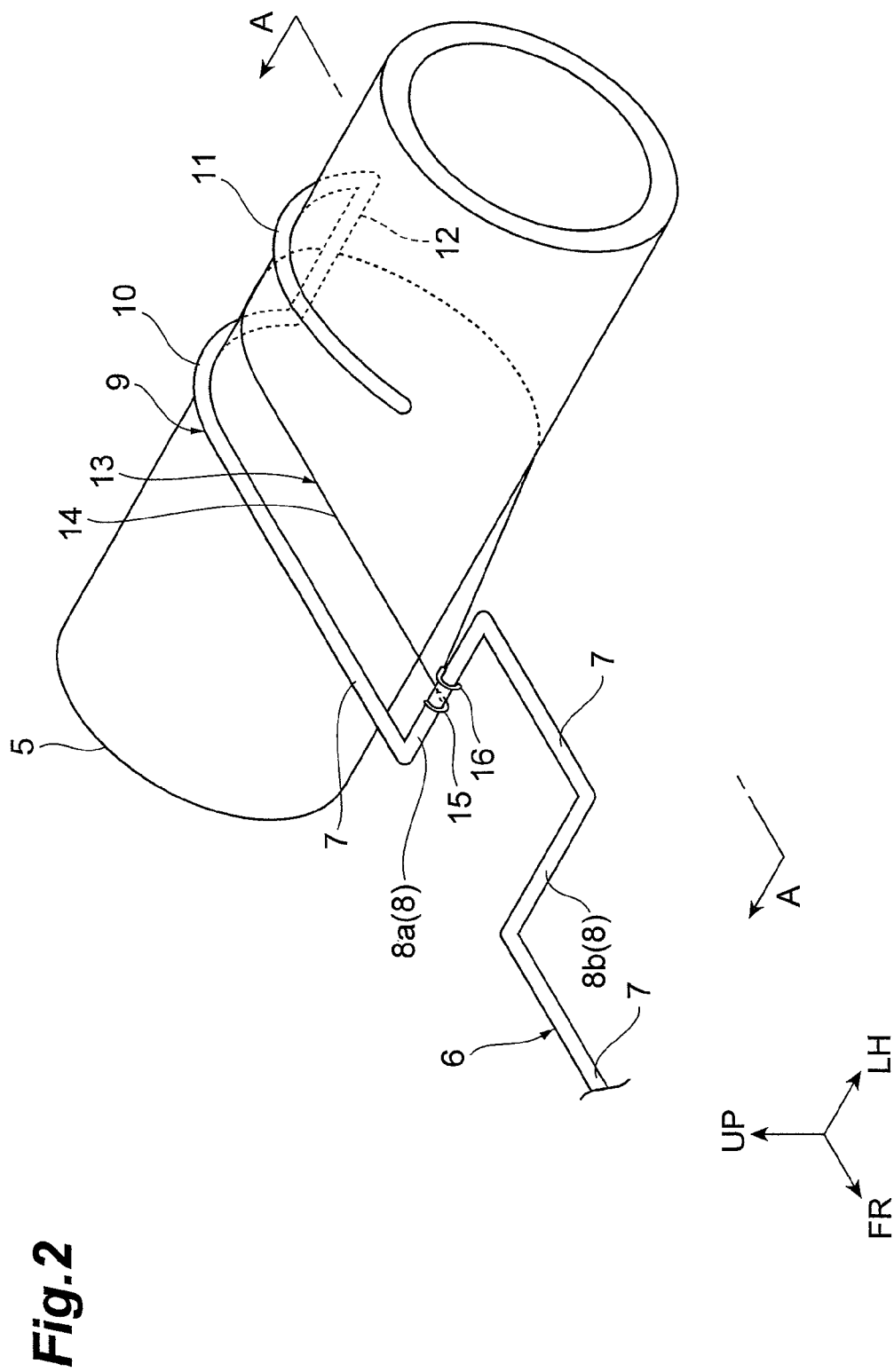
FIG. 2 is a partially enlarged view of the vehicle seat shown in FIG. 1.
Figure 3:
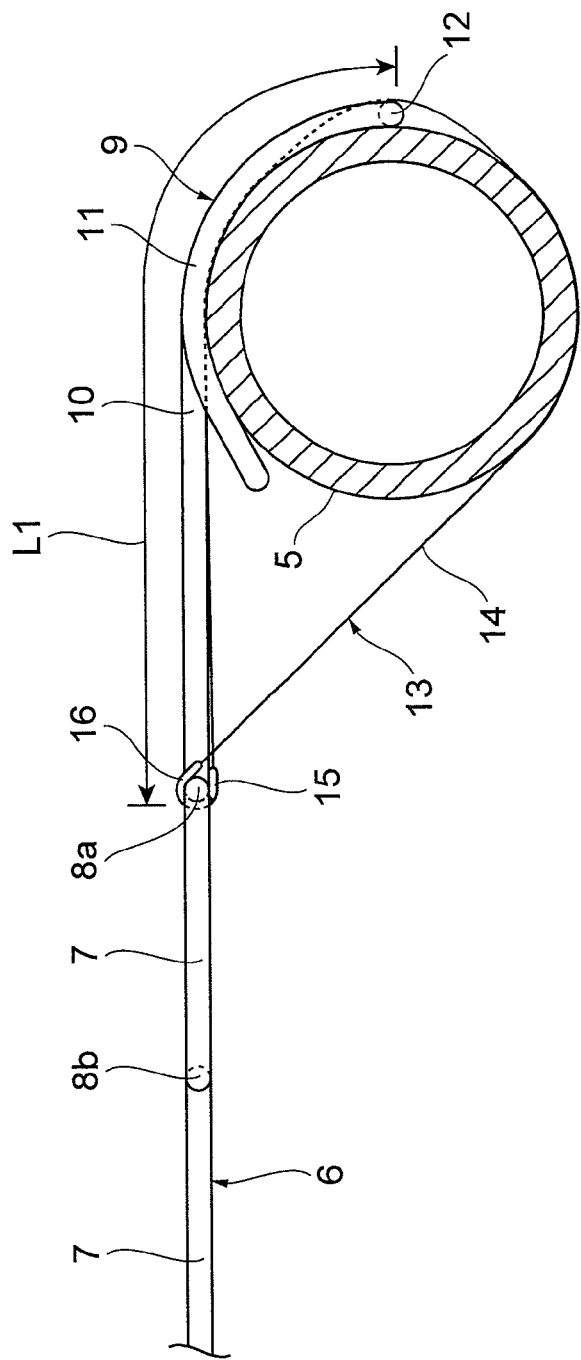
FIG. 3 is a cross-sectional view taken along line III-III shown in FIG. 2.

FIG. 1 shows a partial perspective view illustrating an inner structure of the vehicle seat according to the embodiment. FIG. 2 shows a partially enlarged view of the vehicle seat shown in FIG. 1. FIG. 3 shows a cross-sectional view taken along line III-III shown in FIG. 2. As shown in FIG. 1 to FIG. 3, the vehicle seat 1 according to this embodiment is provided with a seating portion 2 in which a cushion property (bending property) of a seat cushion may be changed.

The seating portion 2 includes a pair of left and right seat frames 3a and 3b that make up a skeleton of the vehicle seat 1, a sheet-shaped front-side shaft 4 that is connected to a front end portion of each of the seat frames 3a and 3b, a circular tube-shaped back-side shaft 5 that is connected to a back-end portion of each of the seat frames 3a and 3b, a plurality of S springs 6 that are stretched to the front-side shaft 4 and the back-side shaft 5 and extend in a front-back direction of the vehicle seat 1, and a restriction member 13 that restricts the extensional deformation of the S springs 6. In addition, the seat frames 3a and 3b, the front-side shaft 4, and the back-side shaft 5 make up a seat cushion frame that supports a seat cushion (not shown).

The S springs 6 are formed in a substantial S-shape by bending a linear member such as a steel wire. Specifically, in each of the S springs 6, a vertical portion 7 that extends in the front-back direction of the vehicle seat 1, which is the stretching direction of the S spring 6, and a horizontal portion 8 that extends in a crosswise direction of the vehicle seat 1, which is a direction orthogonal to the stretching direction of the S spring 6, are alternately connected to each other with a predetermined pitch. That is, the S spring 6 is formed in a substantial S-shape in a top plan view of the vehicle seat 1, and is formed in a line shape of a straight line or a curve in a side plan view of the vehicle seat 1. Therefore, a bending property of the S spring 6 is expressed by bending rigidity (bending property) and tensile rigidity (tensile property). In addition, in this embodiment, the horizontal portion 8, which is disposed at the most back side of the vehicle seat 1, is indicated as a horizontal portion 8a, and the horizontal portion 8, which is disposed at a front side of the horizontal portion 8a in regard to one vehicle seat 1, is indicated as a horizontal portion 8b. In addition, the stretching direction of the S spring 6 is a direction in which the S spring 6 is stretched and an extension direction of the entirety of the S springs 6.

A back-end portion 9 of the S spring 6 is formed in a hook shape that is capable of being locked on the back-side shaft 5 by bending a linear member. Specifically, the back-end portion 9 of the S spring 6 includes a pair of hook portions 10 and 11 that are curved in an arc shape along an outer circumferential surface of the back-side shaft 5 and are hooked on the back-side shaft 5, and a back-end portion 9 that is connected to the front end of each of the pair of hook portions 10 and 11 and extends in the crosswise direction of the vehicle seat 1, which is a direction orthogonal to the stretching direction of the S spring 6. In addition, one hook portion 10 is connected to the vertical portion 7 and the other hook portion 11 becomes a free end. Therefore, when the pair of hook portions 10 and 11 is hooked on the back-side shaft 5, the S spring 6 may be locked on the back-side shaft 5.

In addition, a description with respect to a specific connecting structure between the front-end portion of the S spring 6 and the front-side shaft 4 is omitted, but the front-end portion of the S spring 6 may be connected to the front-side shaft 4 with various known methods such as hooking and welding.

Figure 4:
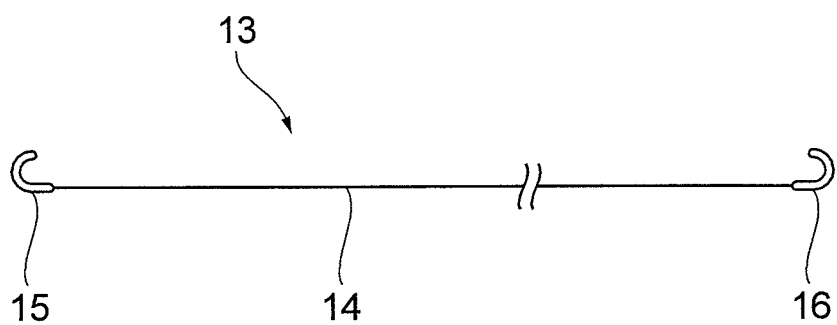
FIG. 4 is a side view of a restriction member.

FIG. 4 shows a side view of the restriction member. As shown in FIG. 4, the restriction member 13 includes a pair of wire hook portions 15 and 16, and a long wire portion 14 that connects the one wire hook portion 15 and the other wire hook portion 16.

The wire hook portions 15 and 16 are members that are hooked on the horizontal portion 8 and the back-end horizontal portion 12 of the S spring 6. That is, the wire hook portions 15 and 16 are detachably locked with respect to the horizontal portion 8 and the back-end horizontal portion 12 of the S spring 6. In addition, the wire hook portions 15 and 16 may have arbitrary shape as long as these may be locked on the horizontal portion 8 and the back-end horizontal portion 12 of the S spring 6, and for example, may be formed in various shapes such as a U-shape and a V-shape.

The wire portion 14 has low bending rigidity. The bending rigidity is a parameter indicating a difficult-to-bend property, and the lower the bending rigidity is, the more easily the wire portion 14 is bent. In addition, the wire portion 14 has high extensional rigidity. The extensional rigidity is a parameter indicating a difficult-to-extend property, and the higher the extensional rigidity is, the more difficult the wire portion 14 extends. As described above, since the wire portion 14 restricts the extensional deformation of the S spring 6, it is preferable that the wire portion 14 have non-elasticity. However, it is not necessary for the wire portion 14 to have the non-elasticity, and the wire portion 14 may at least have extensional rigidity higher than that of the S spring 6. In addition, as the wire portion 14, a steel wire that is in general circulation may be used from an economical aspect. However, the shape of the wire portion 14 is not limited, and for example, the wire portion 14 may be formed in various shapes such as a linear shape and a tape shape.

In addition, when the wire hook portions 15 and 16 are hooked on the horizontal portion 8 and the back-end horizontal portion 12 of the S spring 6 in a manner that the wire portion 14 does not become loose, the extensional deformation of the S spring 6 may be partially restricted.

At this time, the restriction member 13 is locked on the S spring 6 in a state in which the wire hook portions 15 and 16 are hooked on the horizontal portion 8 and the back-end horizontal portion 12 of the S spring 6 in a simple manner. Therefore, the extensional deformation restriction position and length in the S spring 6 may be changed by detaching the wire hook portions 15 and 16 from the horizontal portion 8 and the back-end horizontal portion 12 of the S spring 6 or by reinstalling the detached wire hook portions 15 and 16 to another horizontal portion 8 and the back-end horizontal portion 12 of the S spring 6.

Figure 5:
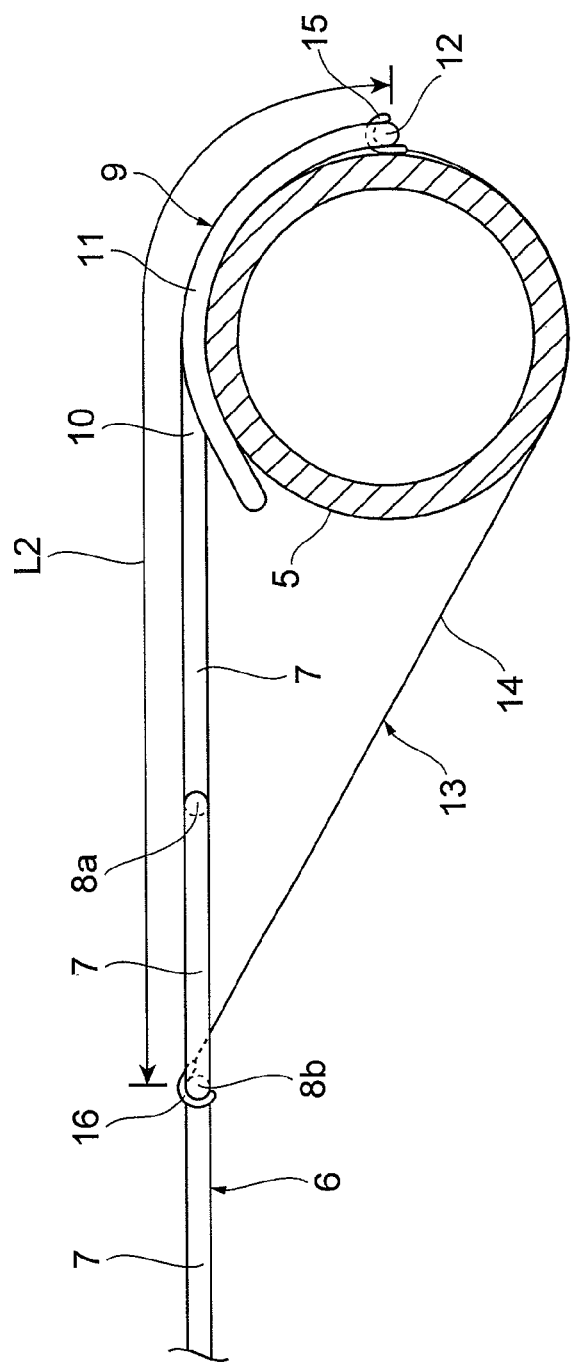
FIG. 5 is a cross-sectional view illustrating a state in which a locking position of the restriction member is changed with respect to a state shown in FIG. 3.

A method of changing the extensional deformation restriction position and length in the S spring 6 will be described with reference to FIGS. 3 and 5. FIG. 5 shows a cross-sectional view illustrating a state in which a locking position of the restriction member is changed with respect to a state shown in FIG. 3.

First, as shown in FIG. 3, the one wire hook portion 15 is hooked on the horizontal portion 8a, and then the wire portion 14 is wrapped around the back-side shaft 5, and then the other wire hook portion 16 is hooked on the horizontal portion 8a. In this manner, the extensional deformation of the S spring 6 is restricted by the restriction member 13 in a range L1 from the horizontal portion 8a to the back-end horizontal portion 12.

At this time, when a load is applied to the S spring 6, the back-end horizontal portion 12 locked on the back-end shaft 5 is pressed onto the back-shaft 5 side by the wire portion 14, which is wrapped around the back-side shaft 5, of the restriction member 13. Therefore, even when a large load is applied to the S spring 6 and the S spring 6 is largely bent, the S spring 6 doesn't drop out from the back-side shaft 5.

In this state, when changing the extension deformation restriction position and length in the S spring 6, first, the wire hook portions 15 and 16 are detached from the horizontal portion 8a. In this manner, the restriction against the extensional deformation of the S spring 6 due to the restriction member 13 is released.

In addition, as shown in FIG. 5, the one wire hook portion 15 is hooked on the back-end horizontal portion 12, and then the wire portion 14 is wrapped around the back-side shaft 5 at a portion thereof that is opposite to the hook portions 10 and 11 of the S spring 6, and the other hook portion 16 is hooked on the horizontal portion 8b. In this manner, the extensional deformation of the S spring 6 is restricted by the restriction member 13 in a range L2 from the horizontal portion 8b to the back-end horizontal portion 12.

At this time, when a load is applied to the S spring 6, the back-end horizontal portion 12 locked on the back-side shaft 5 is pulled to a portion of the back-side shaft 5, which is opposite to the hook portions 10 and 11 of the S spring 6, by the restriction member 13. Therefore, even when a large load is applied to the S spring 6 and the S spring 6 is largely bent, the S spring 6 doesn't drop out from the back-side shaft 5.

In addition, in this embodiment, it is preferable that the bending position of the S spring 6 be set so that the state shown in FIG. 3 and the state shown in FIG. 5 may be realized using one restriction member 13. In addition, in a case where the state shown in FIG. 3 and the state shown in FIG. 5 may not be realized using one restriction member 13, the state shown in FIG. 3 and the state shown in FIG. 5 may be realized using restriction members 13 having lengths different from each other.

Figure 6:
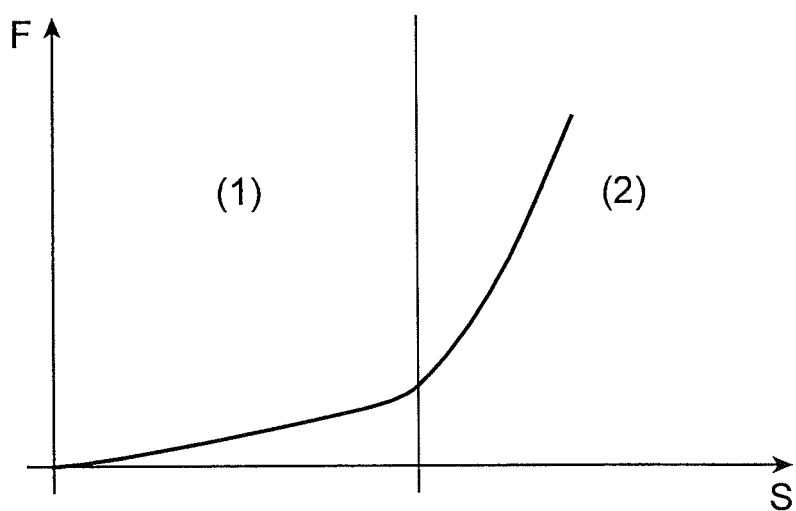
FIG. 6 is a view illustrating an ideal F-S curve of the vehicle seat.
Figure 7:
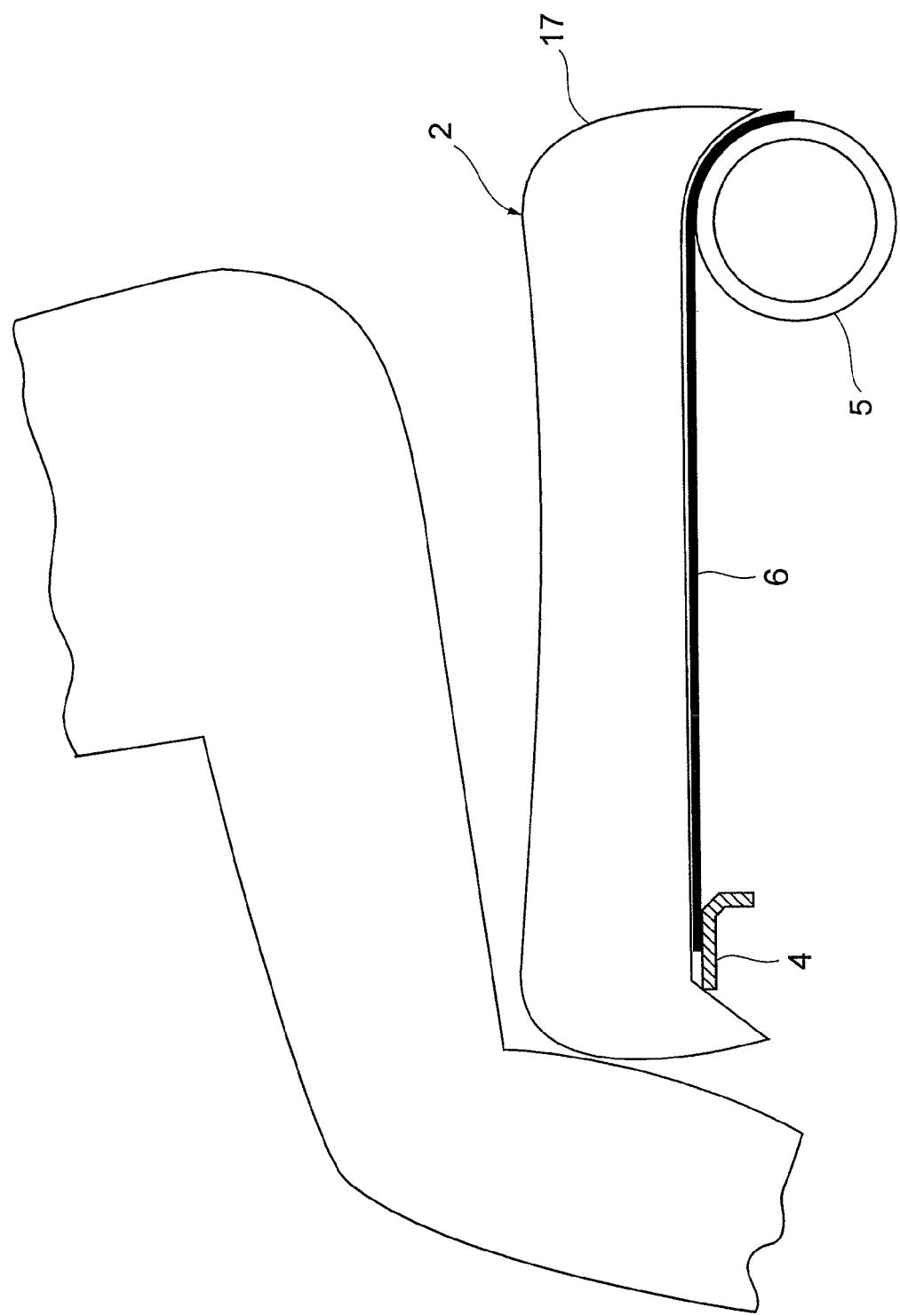
FIG. 7 is a side view illustrating a state immediately before a passenger sits on the vehicle seat.
Figure 8:
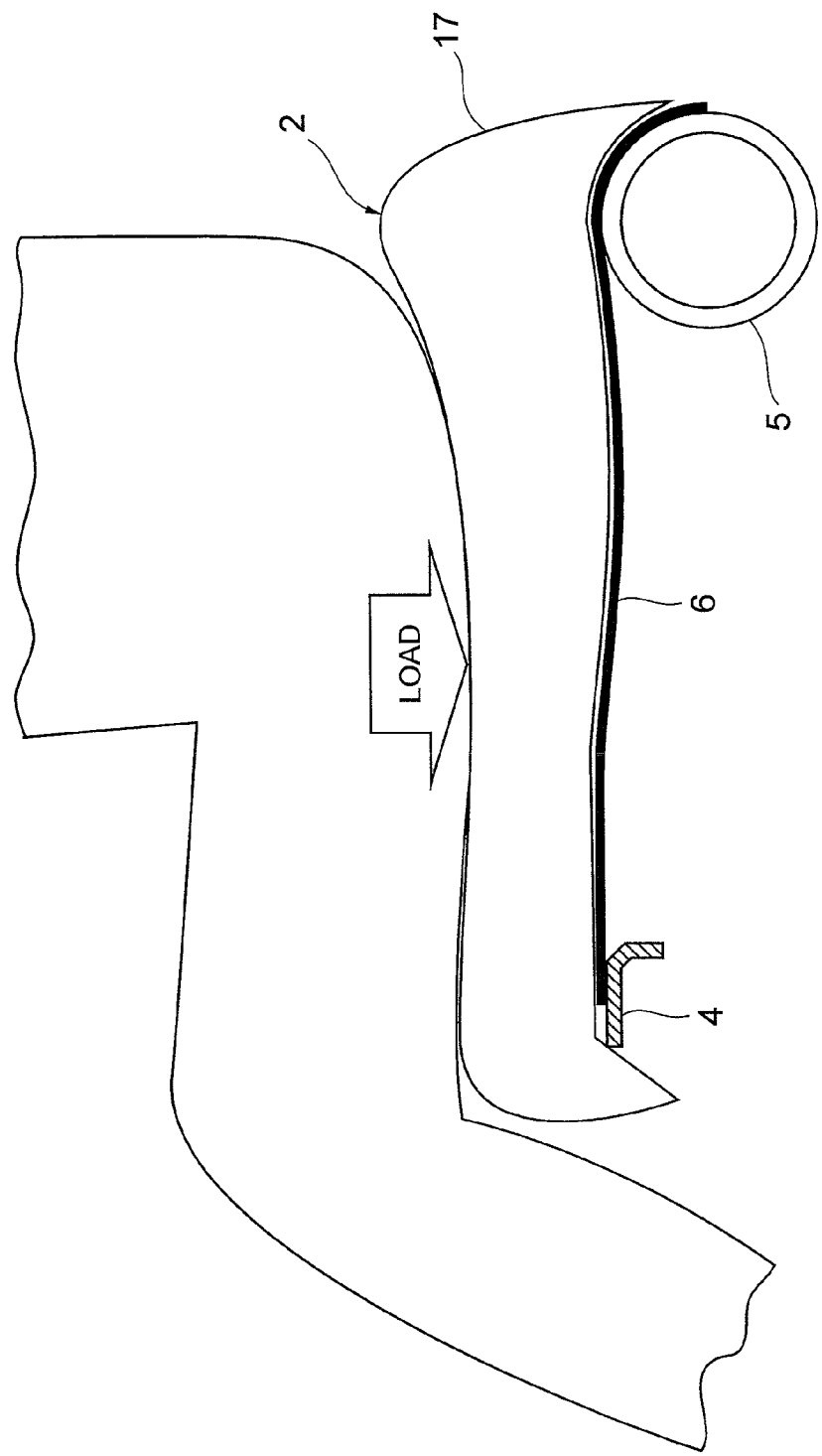
FIG. 8 is a side view illustrating a state in which the passenger sits on the vehicle seat.
Figure 9:
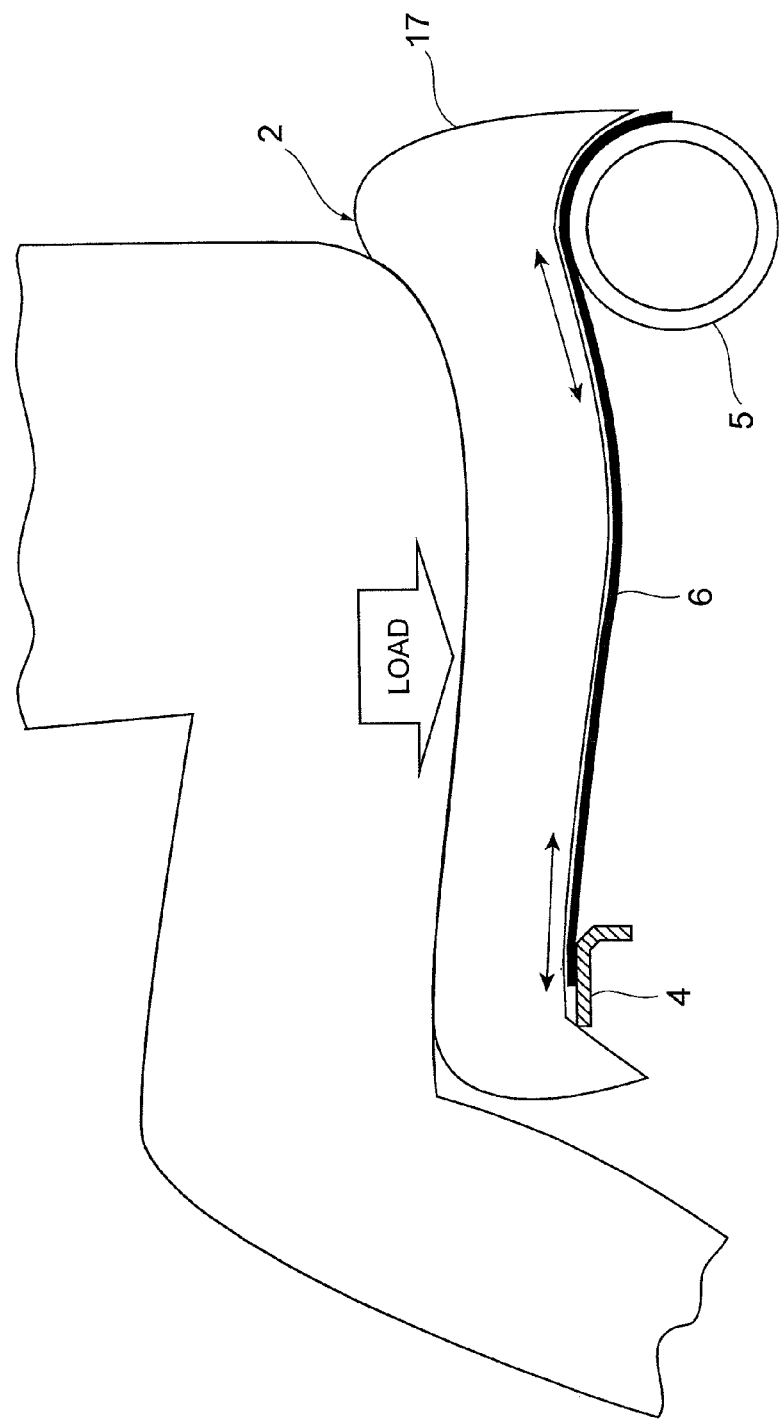
FIG. 9 is a side view illustrating a state in which a vertically downward external force is applied to the passenger who sits on the vehicle seat.

Here, a bending property of the vehicle seat 1 will be described with reference to FIG. 6 to FIG. 9. FIG. 6 shows a view illustrating an ideal F-S curve of the vehicle seat. FIG. 7 shows a side view illustrating a state immediately before a passenger sits down on the vehicle seat. FIG. 8 shows a side view illustrating a state in which the passenger sits down on the vehicle seat. FIG. 9 shows a side view illustrating a state in which a vertically downward external force is applied to the passenger who sits on the vehicle seat. In FIG. 7 to FIG. 9, for easy understanding, a seat cushion 17 that is mounted on the S springs 6 and is formed of urethane or the like is illustrated, and the restriction member 13 is not shown.

In general, in a case where the S spring 6 is made to be excessively soft so as to improve riding comfort during normal driving when a vertically downward external force is applied to the passenger, the passenger sinks into the seating portion 2 excessively. On the other hand, in a case where the S spring 6 is made to be excessively hard in order for the passenger not to sink into the seating portion 2 excessively when the vertically downward external force is applied to the passenger, riding comfort during normal driving is deteriorated. Therefore, as shown in FIG. 6, it is preferable that in a load range (1) of the passenger during normal driving, the S spring 6 be made to have a soft property, and in a load range (2) exceeding the load range of the passenger during normal driving, the S spring 6 be made to have a hard property.

As described above, the bending property of the S spring 6 is expressed by bending rigidity (bending property) and tensile rigidity (tensile property). However, as shown in FIG. 6 and FIG. 7, in an initial state in which the load of the passenger is applied to the seating portion 2, since a bending amount of the S spring 6 is small, the bending rigidity of the S spring 6 is mainly utilized. On the other hand, as shown in FIG. 8, when the vertically downward external force is applied to the passenger, since the bending amount of the S spring 6 increases, the extensional rigidity of the S spring is mainly utilized. In addition, when the extensional deformation of the S spring 6 is partially restricted due to the restriction member 13, since the entire length of the S spring 6 in which the S spring may extend becomes shorter, the tensile rigidity of the S spring 6 may be raised.

Therefore, in this embodiment, the bending rigidity of the S spring 6 is set to be low and the extensional deformation of the S spring 6 may be partially restricted by the restriction member 13. Therefore, during normal driving, the bending rigidity of the S spring 6 is mainly utilized and therefore the seating portion 2 becomes soft and riding comport is good. On the other hand, when the vertically downward external force is applied to the passenger, the extensional rigidity of the S spring 6 is mainly utilized, and therefore the seating portion 2 becomes hard and the excessive sinking of the passenger on the seating portion 2 is suppressed.

In this manner, according to the vehicle seat 1 related to this embodiment, even when the riding comfort is improved by lowering the bending rigidity of the S spring 6, the extensional deformation of the S spring 6 is restricted by the restriction member 13 and therefore the S spring 6 may be set to have a property shown in FIG. 5.

However, even when the S spring 6 is set to have a property shown in FIG. 5, when a passenger is changed, the riding comfort that is required is also changed, and when a body weight (body type) of the passenger who sits on the seat is changed, a load applied to the seating portion 2 is also changed. Therefore, it is preferable that the property of the S spring 6 be changed in response to the passenger who sits on the vehicle seat.

Figure 10:
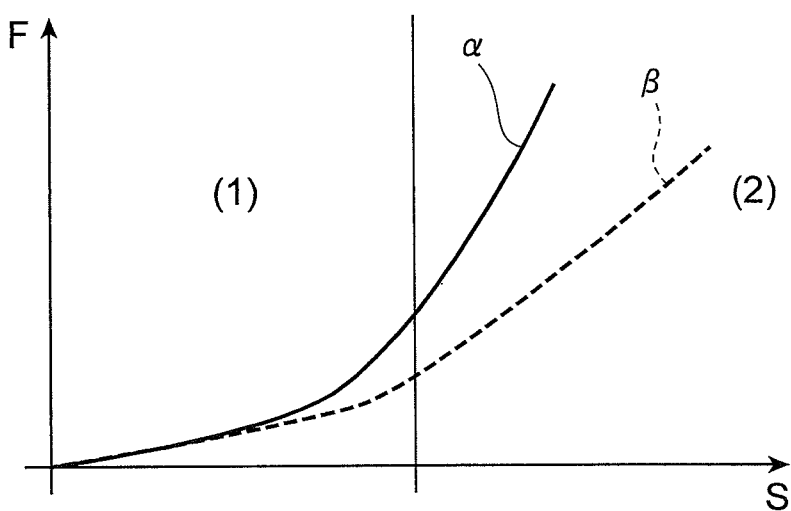
FIG. 10 is a view illustrating ideal F-S curves of the vehicle seat, which are required by passengers having body weights different as each other.

FIG. 10 shows a view illustrating ideal F-S curves of the vehicle seat, which are required by passengers having body weights different as each other. With a passenger having a heavy body weight, the sinking amount on the seating portion 2 becomes larger than that of a passenger having a light body weight. Therefore, as shown in FIG. 10, in a case where a passenger having a heavy body weight sits on the vehicle seat, it is preferable that the S spring 6 be made to be hard compared to a case in which a passenger having a light body weight sits on the vehicle seat. Particularly, in a case where the vertically downward external force is applied to a passenger, since the sinking amount of the passenger on the seating portion 2 increases compared to normal driving, when a passenger having a heavy body weight sits on the seat, it is preferable that the S spring 6 be made to be significantly harder compared to a case where a passenger having a light body weight sits on the seat. In addition, in FIG. 10, a line a indicates an ideal F-S curve of the vehicle seat, which is required by a passenger having a heavy body weight, and a line β indicates an ideal F-S curve of the vehicle seat, which is required by a passenger having a light body weight.

Therefore, in the vehicle seat 1 according to this embodiment, the property of the S spring 6 may be changed as shown in FIG. 10 by changing a position at which the wire hook portions 15 and 16 of the restriction member 13 are hooked on the horizontal portion 8 and the back-end horizontal portion 12 of the S spring 6.

That is, as shown in FIG. 3, when the restriction member 13 is locked on the S spring 6, the S spring 6 extends at a portion excluding the range L1 from the horizontal portion 8a to the back-end horizontal portion 12. Therefore, the extensional rigidity of the S spring 6 is determined by a dimension obtained by excluding L1 from the entire length of the S spring 6.

On the other hand, as shown in FIG. 5, when the restriction member 13 is locked on the S spring 6, the S spring 6 extends at a portion excluding the range L2 from the horizontal portion 8b to the back-end horizontal portion 12. Therefore, the extensional rigidity of the S spring 6 is determined by a dimension obtained by excluding L2 from the entire length of the S spring 6.

In this manner, even when the bending rigidity of the S spring 6 itself is the same in each case, the bending rigidity of the S spring 6 may be changed by changing the extensional deformation restriction length in the S spring 6 by the restriction member 13. Therefore, as shown in FIG. 10, the bending property of the S spring 6 may be changed in response to a passenger who sits on the vehicle seat.

As described above, according to the vehicle seat 1 related to this embodiment, the extensional rigidity of the S spring 6 may be raised by partially restricting the extensional deformation of the S spring by the restriction member 13. In addition, since the extensional rigidity of the S spring 6 is changed by changing the extensional deformation restriction length in the S spring by attaching or detaching the restriction member 13, the bending property of the S spring may be changed. In this manner, according to the vehicle seat 1 related to this embodiment, the bending property of the S spring 6 may be changed by the restriction member 13 with a simple configuration that partially restricts the extensional deformation of the S spring 6. In addition, the bending property of the S spring is changed in response to a physique or preference of the passenger, such that a seating property may be improved.

Specifically, since the restriction member 13 may partially restrict the extensional deformation of the S spring by hooking the wire hook portions 15 and 16 on the horizontal portion 8 and the back-end horizontal portion 12, respectively, the locking of the restriction member 13 with respect to the S spring 6 may be easily performed. Furthermore, the extensional deformation restriction length in the S spring 6 may be easily changed by changing the position of the horizontal portion 8 and the back-end horizontal portion 12 that lock the wire hook portions 15 and 16 and the length of the wire portion 14.

Furthermore, when the extensional deformation of the back-end portion of the S spring 6 in the front-back direction of the vehicle is restricted, the rigidity of the back-end portion of the S spring 6 may be raised. Due to this, the falling down of the waist of the passenger who sits on the seat toward a back side is suppressed and therefore the posture-collapsing of the passenger is suppressed. That is, the lumbar vertebrae is disposed at a back side in relation to the ischium, such that when the rigidity of the back-end portion of the seating portion 2 in the front-back direction of the vehicle is low, the lumbar vertebrae rotates and collapses about the ischium. In this case, the S-shape of the vertebra is collapsed, resulting in a so-called bent-back posture. Contrary to this, when the rigidity of the back-end portion of the seating portion 2 in the front-back direction of the vehicle is high, the collapsing of the lumbar vertebrae about the ischium is suppressed, and therefore the S-shape of the vertebra may be easily maintained.

Hereinbefore, a preferred embodiment of the invention has been described, but the invention is not limited to the above-described embodiment.

Figure 11:
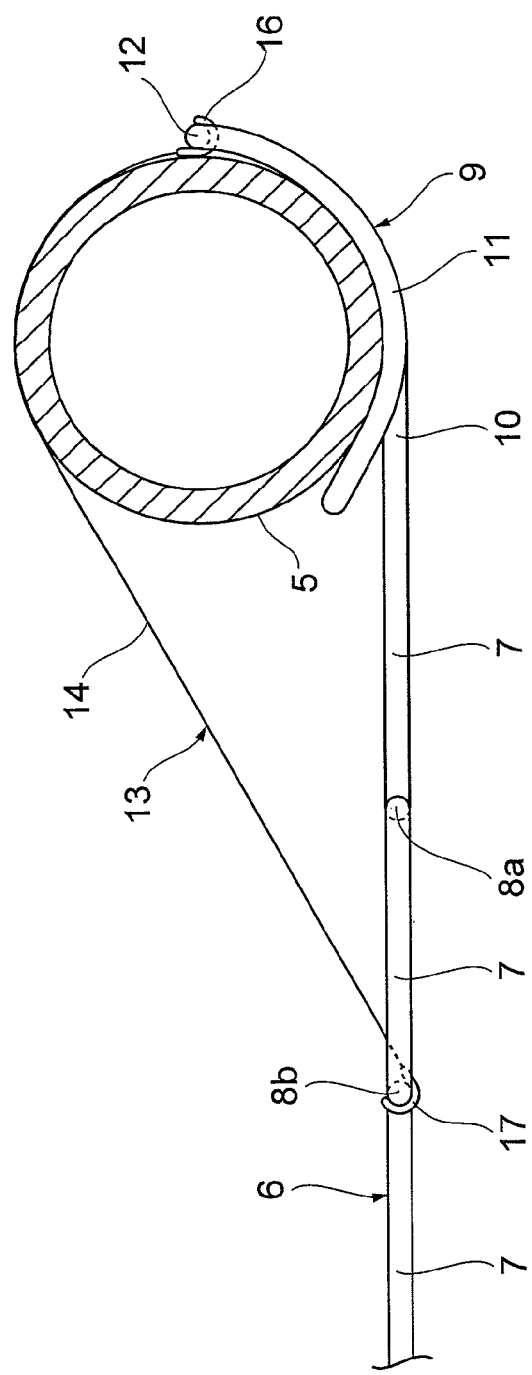
FIG. 11 is a cross-sectional view illustrating a state in which a back-end portion of an S spring and a wire portion of the restriction member are substituted with each other with respect to a state shown in FIG. 5.

For example, in the above-described embodiment, as shown in FIG. 5, the back-end portion 9 of the S spring 6 is locked from an upper side of the back-side shaft 5, and the wire portion 14 of the restriction member 13 is wrapped around a lower side of the back-side shaft 5, but as shown in FIG. 11, the back-end portion 9 of the S spring 6 may be locked from the lower side of the back-side shaft 5, and the wire portion 14 of the restriction member 13 may be wrapped around the upper side of the back-side shaft 5.

Figure 12:
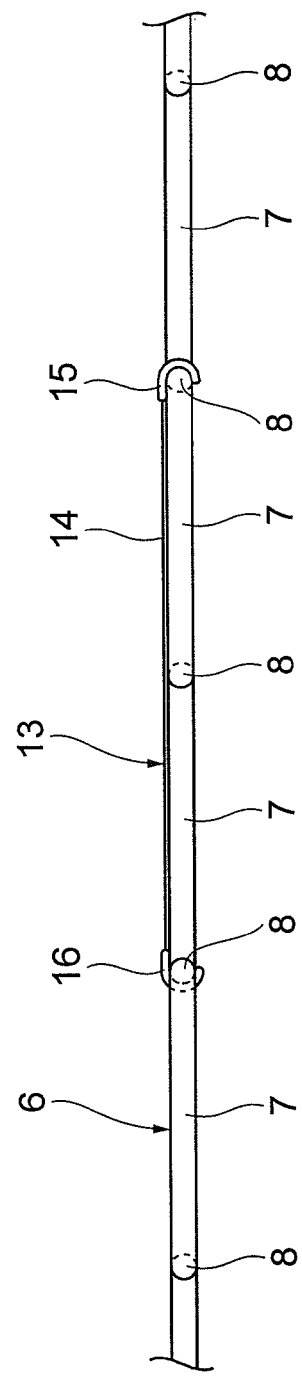
FIG. 12 is a cross-sectional view illustrating a state in which the restriction member is locked on a central portion of the S spring.

In addition, in the above-described embodiment, a description has been given with respect to an example in which the elastic deformation is restricted by the restriction member 13 at a back end portion of the S spring 6 in the front-back direction of the vehicle, but the position in the S spring 6, which restricts the elastic deformation, may be an arbitrary position. For example, as shown in FIG. 12, the wire hook portions 15 and 16 of the restriction member 13 may be hooked on two horizontal portions 8 that are disposed in the middle of the S spring 6, and although not shown, the elastic deformation may be restricted at a front-end portion of the S spring 6 in the front-back direction of the vehicle.

Figure 13:
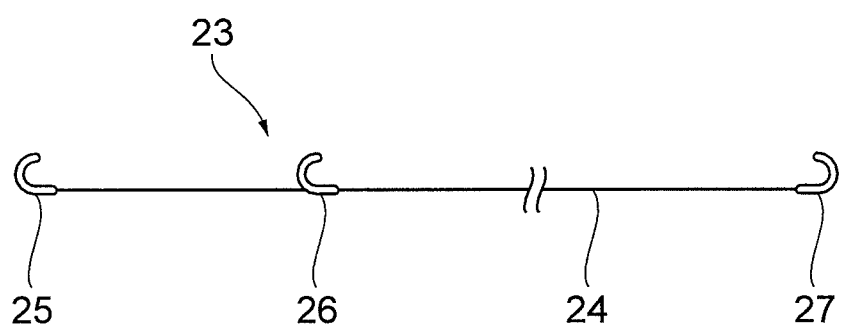
FIG. 13 is a side view illustrating the restriction member to which three wire hook portions are attached.

In addition, in the above-described embodiment, a description has been given with respect to an example in which the wire hook portions 15 and 16 are attached to both ends of the restriction member 13, respectively, but the number of the wire hook portions that are attached to the restriction member 13 is not limited as long as the number is two or more. For example, like a restriction member 23 shown in FIG. 13, three wire hook portions 25, 26, and 27 may be attached to both ends and an intermediate portion of a wire portion 24. In this manner, when three or more wire hook portions are attached, the wire hook portions that are attached to the horizontal portion 8 and the back-end horizontal portion 12 of the S spring 6 may be selected. According to this configuration, the extensional deformation restriction length in the S spring may be changed with various manners by one restriction member.

INDUSTRIAL APPLICABILITY

The invention may be used as a vehicle seat mounted in a vehicle.

REFERENCE SIGNS LIST

1 . . . Vehicle seat
2 . . . Seating portion
3a, 3b . . . Seat frame (Seat cushion frame)
4 . . . Front-side shaft (Seat cushion frame)
5 . . . Back-side shaft (Seat cushion frame)
6 . . . S spring
7 . . . Vertical portion
8 . . . Horizontal portion
8a . . . Horizontal portion
8b . . . Horizontal portion
9 . . . Back-end portion
10, 11 . . . Hook portion
12 . . . Back-end horizontal portion 13 . . . Restriction member (Restriction means)
14 . . . Wire portion (Long member)
15, 16 . . . Wire hook portion (Locking portion)
17 . . . Seat cushion
23 . . . Restriction member
24 . . . Wire portion (Long member)
25, 26, 27 . . . Wire hook portion (Locking portion)

The invention claimed is:

1. A vehicle seat in which S springs are stretched to a front-side shaft and a rear-side shaft of a seating portion in a front-back direction of a vehicle, the vehicle seat comprising:
a restriction member, which is detachably attached to the S springs and is detachably attached to the front-side shaft and the rear-side shaft, for partially restricting an extensional deformation of the S springs,
wherein each of the S springs includes,
a vertical portion that extends in a stretching direction of the S spring, and
a horizontal portion that extends in a direction orthogonal to the stretching direction of the S spring,
wherein the restriction member includes,
a wire portion, and
two or more locking portions that are attached to the wire portion and are locked on the horizontal portion, and
wherein when the wire portion is wrapped around the rear-side shaft and the locking portion is locked on the horizontal portion, the extensional deformation of a back-end portion of the S spring in a front-back direction of the vehicle is partially restricted by the restriction member.

2. The vehicle seat according to claim 1, wherein the wire portion has non-elasticity.

3. The vehicle seat according to claim 1, wherein the wire portion has extensional rigidity higher than that of the S spring.

* * * * *